United States Patent
Armstrong-Crews et al.

(10) Patent No.: US 12,263,865 B1
(45) Date of Patent: Apr. 1, 2025

(54) VALIDATION OF OCCLUSIONS IDENTIFIED WITHIN AUTONOMOUS VEHICLE DRIVING ENVIRONMENTS

(71) Applicant: Waymo LLC, Mountain View, CA (US)

(72) Inventors: Nicholas Armstrong-Crews, Mountain View, CA (US); Mayank Singal, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 231 days.

(21) Appl. No.: 17/940,384

(22) Filed: Sep. 8, 2022

(51) Int. Cl.
*B60W 60/00* (2020.01)

(52) U.S. Cl.
CPC ..... *B60W 60/001* (2020.02); *B60W 2420/408* (2024.01); *B60W 2554/4048* (2020.02)

(58) Field of Classification Search
None
See application file for complete search history.

(56) References Cited

U.S. PATENT DOCUMENTS

| | | | |
|---|---|---|---|
| 2020/0057450 A1* | 2/2020 | Calleija | G06V 10/98 |
| 2020/0309942 A1* | 10/2020 | Kunz | G01S 13/931 |
| 2022/0113402 A1* | 4/2022 | Dvorecki | G01S 13/9027 |
| 2022/0114489 A1* | 4/2022 | Kurian | G01S 13/865 |
| 2022/0214444 A1* | 7/2022 | Das | G01S 17/50 |
| 2022/0253635 A1* | 8/2022 | Yu | B60W 60/0027 |
| 2023/0142299 A1* | 5/2023 | Pan | G01S 17/931 701/301 |
| 2023/0419681 A1* | 12/2023 | Cheng | G01S 7/412 |
| 2024/0096109 A1* | 3/2024 | Sharma | G06N 3/0464 |

* cited by examiner

*Primary Examiner* — David P. Merlino
(74) *Attorney, Agent, or Firm* — Lowenstein Sandler LLP

(57) ABSTRACT

A method includes obtaining, by a processing device, radar sensor data from a driving environment of an autonomous vehicle (AV). The radar sensor data corresponds to a field-of-view (FOV) of a radar sensor of the AV. The method further includes identifying, by the processing device from the radar sensor data, a potential occlusion within the driving environment, obtaining, by the processing device, non-radar sensor data from the driving environment, the non-radar sensor data corresponding to a FOV of a non-radar sensor of the AV, determining, by the processing device from the non-radar sensor data, whether the potential occlusion is a false occlusion, and in response to determining that the potential occlusion is a false occlusion, removing, by the processing device, the false occlusion from the FOV of the radar sensor.

20 Claims, 7 Drawing Sheets

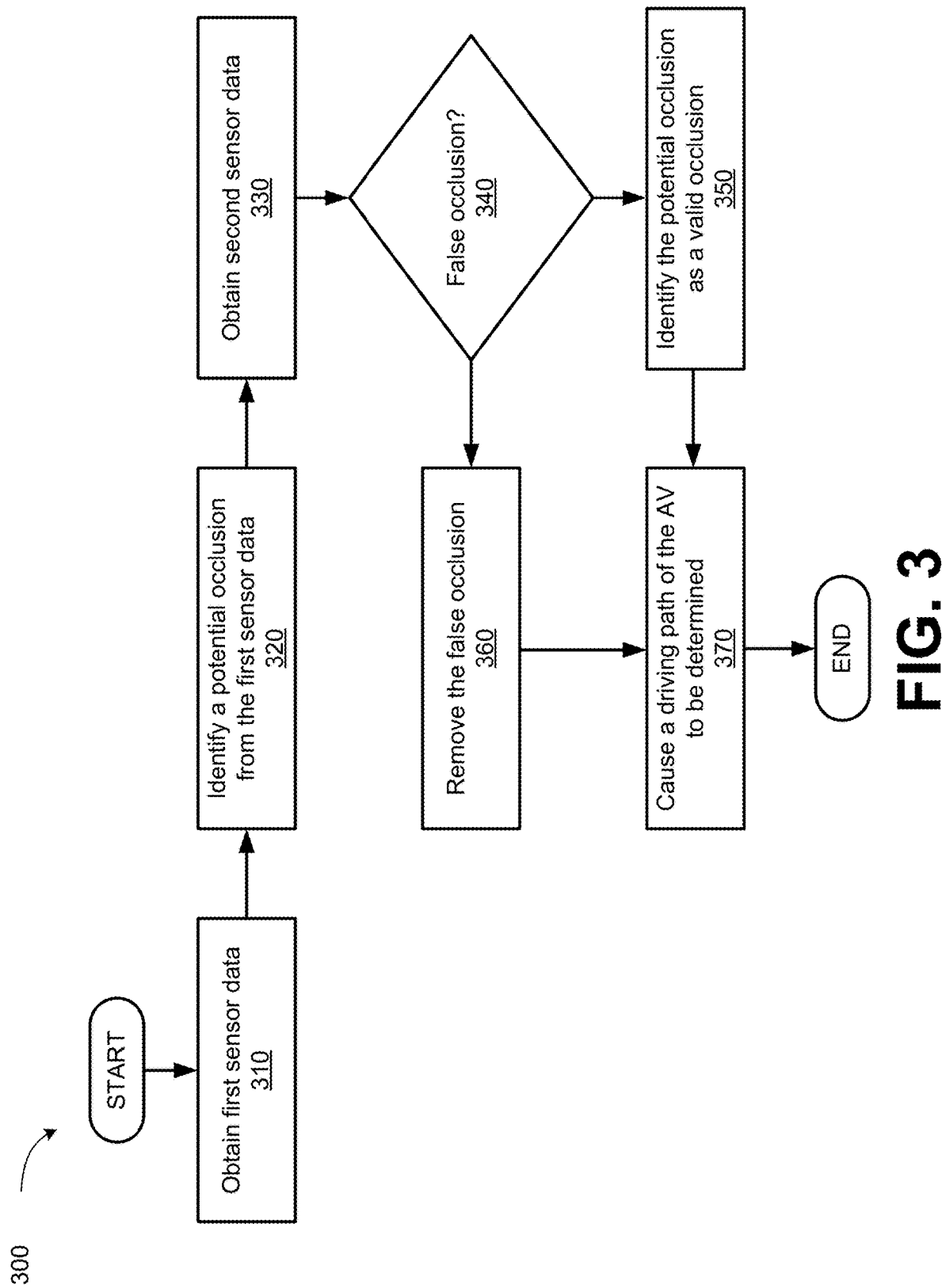

ary collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

VALIDATION OF OCCLUSIONS IDENTIFIED WITHIN AUTONOMOUS VEHICLE DRIVING ENVIRONMENTS

TECHNICAL FIELD

The instant specification generally relates to autonomous vehicles. More specifically, the instant specification relates to improving autonomous driving systems and components by validating occlusions identified within autonomous vehicle (AV) driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 3 is a flowchart illustrating an example method of validating occlusions observed in autonomous vehicle (AV) driving environments, in accordance with some implementations of the present disclosure.

SUMMARY

Figure 1:
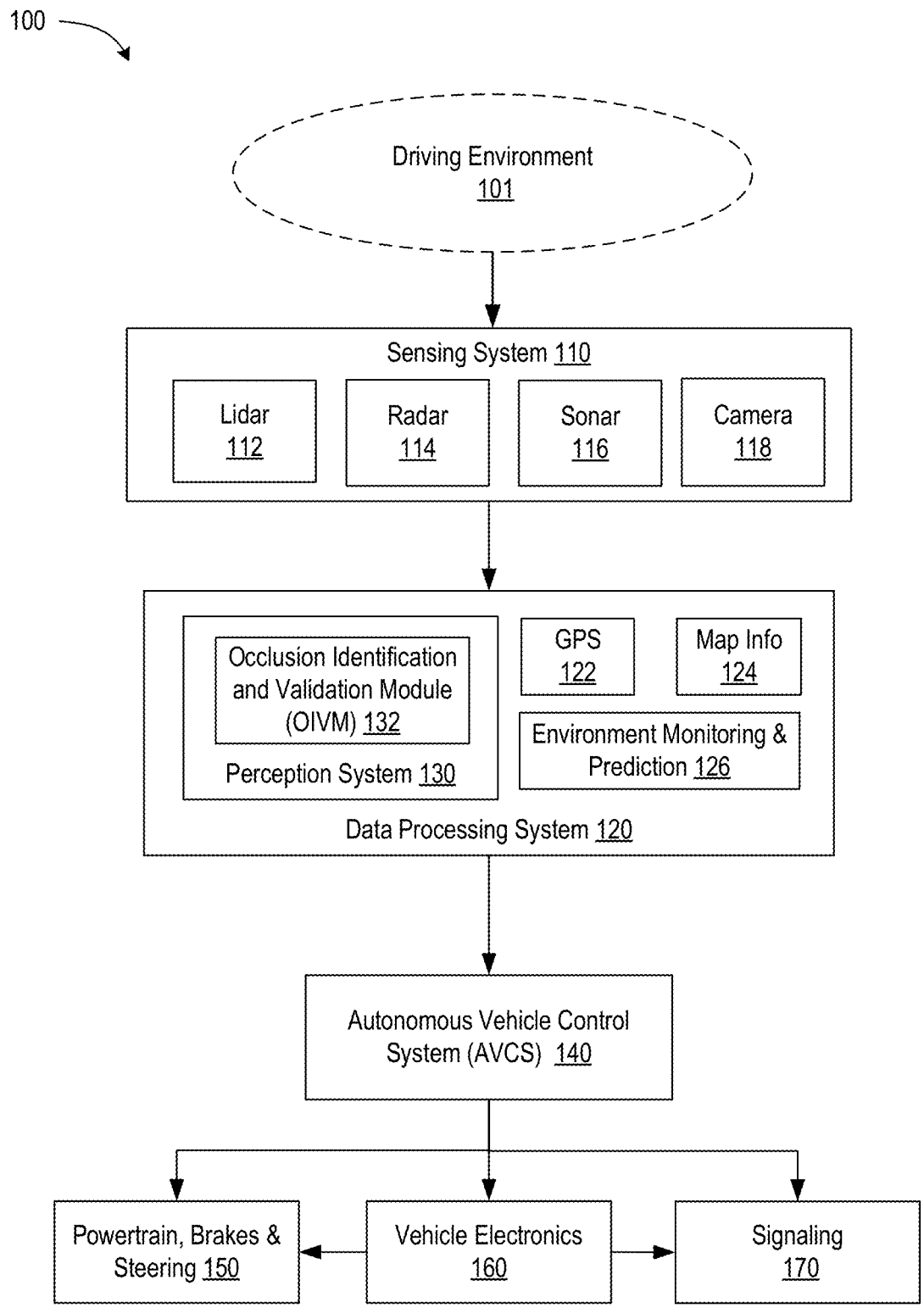
FIG. 1 is a diagram illustrating components of an example autonomous vehicle (AV), in accordance with some implementations of the present disclosure.

In one implementation, disclosed is a system. The system includes a memory storing instructions and a processing device operatively coupled to the memory. The instructions, when executed by the processing device, cause the processing device to perform operations including obtaining first sensor data from a driving environment of an autonomous vehicle (AV). The first sensor data corresponds to a field-of-view (FOV) of a first sensor of the AV. The operations further include identifying, from the first sensor data, a potential occlusion within the driving environment, and obtaining second sensor data from the driving environment. The second sensor data corresponds to a FOV of a second sensor of the AV different from the first sensor. The operations further include determining, from the second sensor data, whether the potential occlusion is a false occlusion, and in response to determining that the potential occlusion is a false occlusion, removing the false occlusion from the FOV of the first sensor.

In another implementation, disclosed is a method. The method includes obtaining, by a processing device, first sensor data from a driving environment of an autonomous vehicle (AV). The first sensor data corresponds to a field-of-view (FOV) of a first sensor of the AV. The method further includes identifying, by the processing device from the first sensor data, a potential occlusion within the driving environment, and obtaining, by the processing device, second sensor data from the driving environment. The second sensor data corresponds to a FOV of a second sensor of the AV different from the first sensor. The method further includes determining, by the processing device from the second sensor data, whether the potential occlusion is a false occlusion, and in response to determining that the potential occlusion is a false occlusion, removing, by the processing device, the false occlusion from the FOV of the first sensor.

In another implementation, disclosed is a non-transitory computer-readable storage medium. The non-transitory computer-readable storage medium has instructions stored thereon that, when executed by a processing device, cause the processing device to perform operations including obtaining radar sensor data from a driving environment of an autonomous vehicle (AV). The radar sensor data corresponds to a field-of-view (FOV) of a radar sensor of the AV. The operations further include determining, from the radar sensor data, whether a potential occlusion exists within the driving environment, in response to determining that a potential occlusion exists within the driving environment, and obtaining non-radar sensor data from the driving environment. The non-radar sensor data corresponds to a FOV of a non-radar sensor of the AV. The operations further include determining, from the non-radar sensor data, whether the potential occlusion is a false occlusion, in response to determining that the potential occlusion is a false occlusion, removing the false occlusion from the FOV of the radar sensor to reclaim free space within the FOV of the radar sensor, and causing a driving path of the AV to be determined based on the free space.

DETAILED DESCRIPTION

An autonomous vehicle (AV) can employ one or more sensors to detect distances to various objects in the environment and the velocities of such objects. For example, a radio detection and ranging (radar) sensor can emit one or more radio wave signals (e.g., radio pulses) that travel to an object, and then detect arrived radio wave signals reflected from the object. As another example, a light detection and ranging (lidar) sensor emits one or more light wave signals (e.g., laser pulses) that travel to an object and detects arrived light wave signals reflected from the object. By determining a time delay between the signal emission and the arrival of the reflected waves, a sensor can determine the distance to the object.

A sensor can emit signals in one or more directions to obtain a view of the outside driving environment. More specifically, each signal can reflect off of an object of the driving environment, and the sensor can determine the presence and distance of an object using the return signal caused by the reflection. In some implementations, an AV can include multiple radar sensors to capture a full 360-degree field-of-view (FOV), and each radar sensor can capture a respective sector of the 360-degree field-of-view (FOV). Each radar sensor can operate concurrently, and frequency-division multiplexing can be used to prevent interference. For example, the AV can include four radar sensors, and each radar sensor can image a 90-degree sector of the FOV. Alternatively, any smaller sector can be scanned, as desired.

Time-of-flight (ToF) sensors can be used for ranging. ToFs can also be capable of determining the velocity (speed and direction of motion) of a return point by emitting two or more signals (e.g., as part of different sensing frames) in a quick succession and detecting the position of the reflecting surface as the surface moves with each additional frame. The intervals between successive signals (frames) can be short enough so that the object does not change its position appreciably in relation to other objects of the environment, but still long enough to allow the radar or lidar to detect accurately the changes in the object's position. Coherent sensors, e.g., frequency-modulated continuous wave (FMCW) radars and/or lidars take advantage of a phase information encoded into transmitted signals (and carried by the emitted electromagnetic waves to the target and back) and provide additional functionality. A coherent sensor detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface Vr that is parallel to the direction of the wave propagation, herein referred to as the "radial" velocity. A coherent sensor allows associating a radial velocity with the return points of the point cloud. This additional information (which can be obtained separately or together with the range information) helps the sensing system of the autonomous vehicle to identify the state of the motion of various objects.

Radar sensors can be inexpensive, can have a large working range of distances, and can possess a good tolerance to adverse driving environment conditions (e.g., foggy, snowy, or misty driving conditions). Because of the relatively low cost and low complexity of radar sensors, multiple radar sensors can be mounted on a vehicle and positioned at locations that collectively provide a 360-degree FOV, as described above. As a result, even when a view from a single lidar sensor mounted in the middle of the roof of a vehicle is obscured by an obstacle (e.g., a doubly parked car or truck), other radar sensors (e.g., mounted on rear-view mirrors) can still provide a good view into the obscured portion of the roadway.

Precision of radar returns, however, can be limited. For example, a radar image can identify occlusions to the FOV of the radar sensor that are not actually present, referred to herein as false occlusions. One type of false occlusion is a side lobe. An ideal dipole antenna would have a forward lobe (i.e., main lobe) and a backward lobe (i.e., minor lobe) oriented about 180° relative to the forward lobe. A side lobe is another type of minor lobe in which radiation is distributed radially between the forward lobe and the backward lobe. Side lobes can occur because the radar signal is directed via constructive interference from multiple elements of the radar antenna. For example, a side lobe can result from a bright object entering into a nearby azimuthal bin of the radar image (at the same range). Accordingly, side lobes can be generated as artifacts of reflections of radar signals by buildings, structures, vehicles, and other objects. Another example of a false occlusion is an overhead object. An overhead object can be indistinguishable in 2D radar imagery from on-ground objects. A false occlusion can cause the vehicle to brake suddenly or perform some other unnecessary driving action (e.g., a steering maneuver) that can negatively affect safety and ride comfort of the autonomous vehicle, as well as safety of other people and vehicles.

Aspects and implementations of the present disclosure address these and other shortcomings of existing radar detection technology by validating occlusions observed in AV driving environments. Implementations described herein can identify an occlusion from first sensor data obtained within a FOV of a first sensor, and leverage second sensor data obtained within a FOV of a second sensor to determine whether the occlusion is valid. The second sensor can be a different type of sensor from the first sensor. In some implementations, the first sensor data is radar sensor data obtained from a radar sensor, and the second sensor data is non-radar sensor data obtained from a non-radar sensor. In some implementations, the first sensor data is non-radar sensor data and the second sensor data is radar sensor data. For example, non-radar sensor data can include lidar sensor data obtained from a lidar sensor. The FOV of the second sensor might have a different range than the FOV of the first sensor. For example, the FOV of a radar sensor may have a greater range than the FOV of a lidar sensor. If the occlusion is determined to be valid, then the occlusion corresponds to an object that is occluding the FOV of the first sensor. If the occlusion is determined to be invalid, then the occlusion is identified as a false occlusion. The false occlusion can be treated as free space and thus removed as an occlusion from the FOV of the first sensor. By removing the false occlusion from the FOV of the first sensor, the first sensor can continue to search for an occlusion further downrange beyond the false occlusion.

For example, a processing device can obtain an intensity value of at least one pixel of first sensor data (e.g., mapping occupancy grid (MOG) pixel). In some implementations, if the first sensor data is radar sensor data, then the intensity value is a radar cross-section (RCS) value of a pixel of radar sensor data. An RCS value measures how detectable an object is by radar (e.g., in decibels per square meter or dBsm), an object property invariant to the range or azimuth from the radar's viewpoint of the object. In some implementations, the intensity value is a signal-to-noise ratio (SNR) value. A SNR value measures the ratio of signal power to noise power (e.g., in dB units).

The processing device can determine, for each pixel, whether the intensity value of the pixel satisfies a threshold condition (e.g., whether the intensity value is greater than a threshold intensity value). If the processing device determines that the intensity value does not satisfy the threshold condition, then the processing device can ignore the pixel as not corresponding to a potential occlusion within the driving environment. If the processing device determines that the intensity value satisfies the threshold condition, then the processing device has identified the pixel as corresponding to a potential occlusion within the driving environment.

The processing device can then determine whether a pixel, identified as a potential occlusion by the first sensor data, is a false occlusion. For example, the processing device can determine whether the pixel is not identified as an occlusion by the second sensor data obtained within a FOV of the second sensor. If a potential occlusion is determined to not be a false occlusion, this means that the pixel is at least a portion of a valid occlusion. Thus, all pixels beyond the range of the pixel, and within the same azimuthal angle of the pixel, are blocked from view of the first sensor. If the potential occlusion is determined to be a false occlusion, this means that the pixel is not a portion of a valid occlusion blocking the FOV of the first sensor. The processing device can cause the false occlusion to be removed from the FOV of the first sensor, which can enable the first sensor to ignore the pixel by treating the pixels beyond the range of the pixel, and within the same azimuthal angle of the pixel, as free space. This can enable the first sensor to continue searching for occlusions further downrange beyond the false occlusion. Accordingly, implementations described herein can improve the effective visibility range within a FOV of a sensor of an AV to be closer to the maximum visibility range by filtering out false occlusions using sensor data obtained within a FOV of a different type of sensor of the AV.

The second sensor data (e.g., non-radar sensor data) can be stored as a perspective range image in one or more dimensions. In some implementations, the second sensor data is stored as a multi-dimensional perspective range image. For example, the second sensor data can be stored as a two-dimensional (2D) perspective range image. Columns of the 2D perspective range image can represent azimuth bins and rows of the 2D perspective range image can represent elevation angle bins. To reduce computational complexity and improve performance of the false occlusion detection, the processing device can compress the multi-dimensional perspective range image into a lower-dimensional perspective range image (i.e., reduce the dimensionality of the second sensor data). For example, the processing device can then compress a dilated 2D perspective range image into a one-dimensional (1D) perspective range image (e.g., similar to radar sensor data). Points irrelevant to autonomous driving concerns can be ignored when reducing the dimensionality of the second sensor data (e.g., points that are less than about 0.2 m above ground and/or greater than about 2 m above ground if the first sensor is a radar sensor). Further details regarding compressing a multi-dimensional perspective range image are described below.

Various types of false occlusions can be detected from first sensor data. For example, if the first sensor data is radar sensor data, then one type of false occlusion is a side lobe, as described above. Other non-radar sensors may not suffer from a similar side lobe phenomenon. For example, for lidar sensors, a laser beam is directed by focusing diverging light rays through an optical lens. Although a "stray light" phenomenon similar to the side lobe phenomenon can exist for lidar data due to a portion of the laser energy being directed elsewhere by the optical lens, the stray light phenomenon can be orders of magnitude smaller in effect as compared to the side lobe phenomenon. If the first sensor data is radar sensor data, then another example of a false occlusion is an overhead object. An overhead object can be indistinguishable in 2D radar imagery from on-ground objects. To be conservative, overhead objects can be treated as worst-case by fully obscuring all elevation angles. Further details regarding false occlusions and false occlusion detection will be described herein below with reference to FIGS. 1-3.

Advantages of the described implementations include fast, efficient and accurate false occlusion detection in AV applications. Such improved perception of autonomous vehicles translates into safer, more comfortable, and more fuel-efficient autonomous driving.

FIG. 1 is a diagram illustrating components of an example autonomous vehicle (AV) 100 capable of combining radar sensor data with camera data for fast and reliable verification of radar detections, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include at least one radar sensor ("radar") 114, which can be any system that utilizes radio or microwave frequency signals to sense objects within the driving environment 101 of the AV 100. The radar 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include at least one lidar sensor ("lidar") 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Radar 114 can include one or more radio/microwave sources producing and emitting signals and one or more detectors of the signals reflected back from the objects. In some implementations, radar 114 (or multiple radars 114) can perform a 360-degree scanning in a horizontal direction. In some implementations, radar(s) 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include at least one camera sensor ("camera") 118 to capture images of the driving environment 101. The images can be two-dimensional projections of the driving environment 101 (or parts of the driving environment 101) onto a projecting surface (flat or non-flat) of the camera 118. In some implementations, multiple cameras 118 can be mounted on AV 100. Some of the cameras 118 of the sensing system 110 can be video cameras configured to capture a continuous (or quasi-continuous) stream of images of the driving environment 101. The sensing system 110 can also include at least one sonar sensor ("sonar") 116, which can be an ultrasonic sonar, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the camera 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar sensor data in combination with the data captured by the camera 118, as described in more detail below.

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 135. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 126 can conclude that object 1 is resuming its motion from a stop sign or a red traffic light signal. Accordingly, the environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 126 can conclude that object 2 is stopping at a stop sign or at a red traffic light signal. Accordingly, the environment monitoring and prediction component 126 can predict where object 2 is likely to be within the next 1 or 3 seconds. The environment monitoring and prediction component 126 can perform periodic checks of the accuracy of its predictions and modify the predictions based on new data obtained from the sensing system 110.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components.

The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In some implementations, the data processing system 120 further includes an occlusion identification and validation module (OIVM) 132. In this illustrative example, the OIVM 132 is included within the perception system 130. However, in other implementations, the OIVM 132 can be included within the environment monitoring and prediction component 126. As will be described in further detail, the OIVM 132 can validate occlusions initially identified from sensor data obtained from the driving environment 101.

For example, the data processing system 120 can receive first sensor data obtained within a field-of-view (FOV) of a first sensor. In some implementations, the first sensor data is radar sensor data obtained within a FOV of the radar 114. In some implementations, the first sensor data is non-radar sensor data obtained within a FOV of a non-radar sensor of the AV 100. For example, the non-radar sensor data can be lidar sensor data obtained within a FOV of the lidar 112.

For example, radar sensor data can include high-level radar sensor data and low-level radar sensor data. The low-level radar sensor data can include the radar intensity map $I(x1, x2, x3)$, where $\{xj\}$ is a set of coordinates. For example, the set of coordinates can include at least one of spherical coordinates, Cartesian coordinates, elliptic coordinates, parabolic coordinates, etc. The radar intensity map identifies an intensity of the radar reflections for various points in the field of view of the radar. The coordinates of objects (or surfaces of the objects) that reflect radar signals can be determined from directional data (e.g., polar and azimuthal angles in the direction of radar transmission) and distance data (e.g., radial distance R determined from the ToF of radar signals). Similarly, the low-level radar sensor data can include a Doppler data (frequency shift) map, $V(x1, x2, x3)$ identifying a radial velocity of reflecting objects, for various spatial points $\{xj\}$ based on detected Doppler shift f of the frequency of the reflected radar signals, $V=\lambda \Delta f/2$, where is the radar wavelength, with positive values $f>0$ associated with objects that move towards radar 114 (and, therefore, the AV) and negative values $f<0$ associated with objects that move away from radar 114. In some implementations, e.g., in driving environments where objects are moving substantially within a specific plane, the radar intensity map and the Doppler map can be defined using two-dimensional coordinates, such as the radial distance and azimuthal angle: $IR, \phi, VR, \phi$.

The high-level radar sensor data can be derived from processing of the low-level data (e.g., using constant false alarm rate (CFAR) detection). For example, locations of local maxima (peaks) of the intensity $I(R, \phi)$ can be identified and output as list of the local maxima, which can be indexed by the coordinates of each i-th local maxima $(R_i, \phi_i)$. Each data entry on the list can be referred to as a radar return point or simply as a return point. Each return point can include the peak value of the intensity $I_i$ and the radial velocity $V_i$ determined from the Doppler shift of the respective radar reflection (e.g., a front bumper of a car, a door of the car, a stop sign, etc.). Accordingly, the list of return points can include multiple sets of data $\{R_i, \phi_i, I_i, V_i\}$, which can further be indexed by a timestamp of the respective radar frame. Each frame can be associated with one period of a scanning operation of the radar 114 (e.g., a full 360-degree view or any other spatial sector of observation assigned to the radar 114).

The OIVM 132 can determine whether one or more potential occlusions are identified from the first sensor data. For example, the first sensor data can be a 2D perspective range image including a number of pixels (e.g., MOG pixels). Without loss of generality, columns of the 2D perspective range image can represent azimuth bins and rows of the 2D perspective range image can represent elevation angle bins. Each pixel can have an associated intensity value. In some implementations, if the first sensor data is radar sensor data, then the intensity value is an RCS value (e.g., in dBsm). In some implementations, the intensity value is a SNR value. For each pixel, the OIVM 132 can determine whether the intensity value of the pixel satisfies an intensity threshold condition. For example, an intensity threshold value can be defined based on experimental data, and the OIVM 132 can determine whether the intensity value of the pixel is greater than the intensity threshold value. In some implementations, the intensity threshold value (e.g., RCS threshold value) is less than or equal to about −15 dBsm. If the OIVM 132 determines that the intensity value of a pixel does not satisfy the intensity threshold condition, then the OIVM 132 can ignore that pixel. If the OIVM 132 determines that the intensity value satisfies the intensity threshold condition, then the OIVM 132 has identified the pixel as corresponding to a potential occlusion.

If no potential occlusions are identified from the first sensor data, then the process ends since the OIVM 132 does not need to validate any potential occlusions. For each potential occlusion identified from the first sensor data, the OIVM 132 can then determine whether the potential occlusion is a false occlusion. To do so, the OIVM 132 can obtain second sensor data obtained within a FOV of a second sensor. The second sensor is of a different type than the first sensor. For example, if the first sensor is the radar 114, then the second sensor can be a non-radar sensor (e.g., the lidar 112). As another example, if the first sensor is a non-radar sensor (e.g., the lidar 112), then the second sensor can be the radar 114. The OIVM 132 can then determine whether the potential occlusion (e.g., pixel) is not identified from the second sensor data. The second sensor data can include a perspective range image, and determining whether the potential occlusion is not identified from the second sensor data can include determining whether the potential occlusion is not visible from the perspective range image. For example, the second sensor data can include a 2D perspective range image. Without loss of generality, columns of the 2D perspective range image can represent azimuthal bins and rows of the 2D perspective range image can represent elevation angle bins.

If a potential occlusion identified from the first sensor data (e.g., pixel of the radar data from the radar 114) is not determined by the OIVM 132 as being a false occlusion from the second sensor data (e.g., lidar data from the lidar 112), this means that the potential occlusion is a valid occlusion corresponding to at least a portion of an object in the driving environment 101 that is occluding the FOV of the first sensor. Otherwise, if the potential occlusion identified from the first sensor data is determined by the OIVM 132 as being false occlusion from the second sensor data, then the OIVM 132 can report the potential occlusion as a false occlusion, which can enable the first sensor (e.g., the radar 114) to ignore the false occlusion and treat the false occlusion as free space. In other words, the false occlusion is removed from the FOV of the first sensor. This can enable the first sensor to continue searching for occlusions further downrange beyond the false occlusion. In some implementations, the false occlusion is a side lobe (e.g., of radar sensor data obtained within a FOV of the radar 114). In some implementations, the false occlusion is an overhead object.

In some cases, the first sensor can have a minimum detection range defining an "undetectable region." For example, the undetectable region for the radar 114 can be a region of space of less than about 2 meters (m) from the position of the radar 114. Objects that may be present within the "undetectable region" can remain undetectable with respect to the first sensor. In some situations, actual occlusions that are located within the undetectable region of the first sensor can remain undetectable by the first sensor, potentially indefinitely. For example, a steel plate permanently located over the front of the first sensor can be an occlusion that prevents the first sensor from seeing objects beyond the steel plate, while not being detectable by the first sensor. To improve safety, in some implementations, the OIVM 132 can assume that the undetectable region of the first sensor always has at least one potential occlusion, and the OIVM 132 can use the second sensor data (e.g., non-radar sensor data) to determine whether the undetectable region of the first sensor has an actual occlusion.

The second sensor data (e.g., non-radar sensor data) can be stored as a multi-dimensional perspective range image. For example, the second sensor data can be stored as a 2D perspective range image. To reduce computational complexity and improve performance of the false occlusion detection process, the OIVM 132 can compress the multi-dimensional perspective range image into a lower-dimensional perspective range image (e.g., reduce the dimensionality of the non-radar sensor data). Points irrelevant to driving concerns can be ignored when reducing the dimensionality of the second sensor data (e.g., less than about 0.2 m above ground and/or greater than about 2 m above ground if the first sensor data is radar sensor data obtained from the radar 114).

The second sensor data (e.g., non-radar sensor data) can be stored as a multi-dimensional perspective range image. For example, the second sensor data can be stored as a 2D perspective range image. In some implementations, to reduce computational complexity and improve performance of the false occlusion detection process, the OIVM 132 can compress the multi-dimensional perspective range image into a lower-dimensional perspective range image (e.g., reduce the dimensionality of the non-radar sensor data). For example, if the second sensor data is stored as a 2D perspective range image, then the OIVM 132 can compress the 2D perspective range image into a 1D perspective range image. Points irrelevant to driving concerns can be ignored when reducing the dimensionality of the second sensor data (e.g., less than about 0.2 m above ground and/or greater than about 2 m above ground if the first sensor data is radar sensor data obtained from the radar 114). In some implementations, the OIVM 132 can further dilate the compressed range image to obtain a dilated compressed range image. Further details regarding radar image compression are described below with reference to FIGS. 3 and 5.

One possible source of error is that the azimuth in a frame of the first sensor data (e.g., azimuth in a frame of the radar sensor data) is not the same as the azimuth in a frame of the second sensor data (e.g., azimuth in a frame of the non-radar sensor data). To address this error, implementations described herein can utilize global coordinates (removing egomotion of the sensors) when checking a pixel of a potential occlusion using the second sensor data.

Figure 2A:
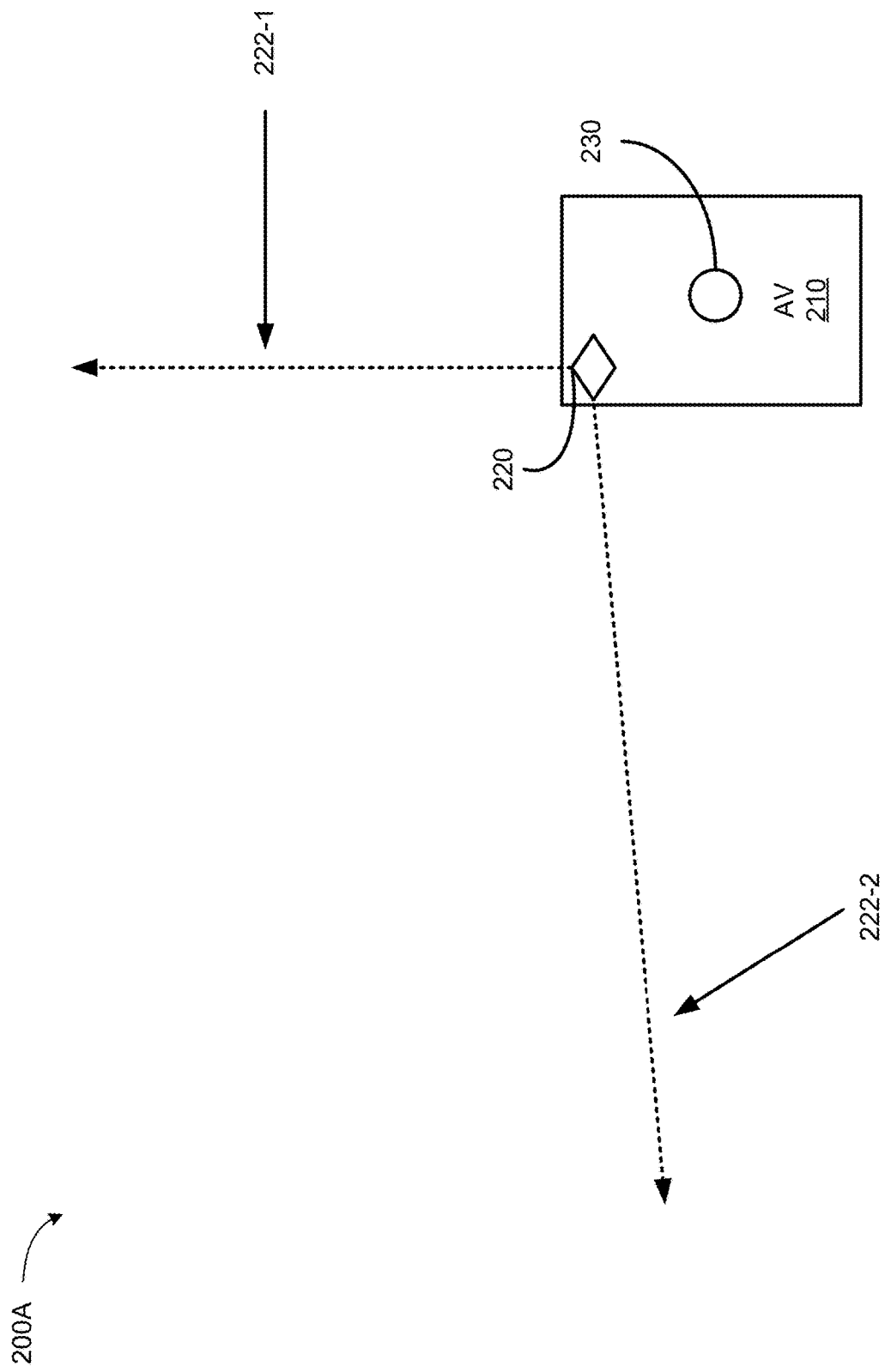
FIGS. 2A-2C are diagrams illustrating an example of validating occlusions observed in an autonomous vehicle (AV) driving environment, in accordance with some implementations of the present disclosure.
Figure 2B:
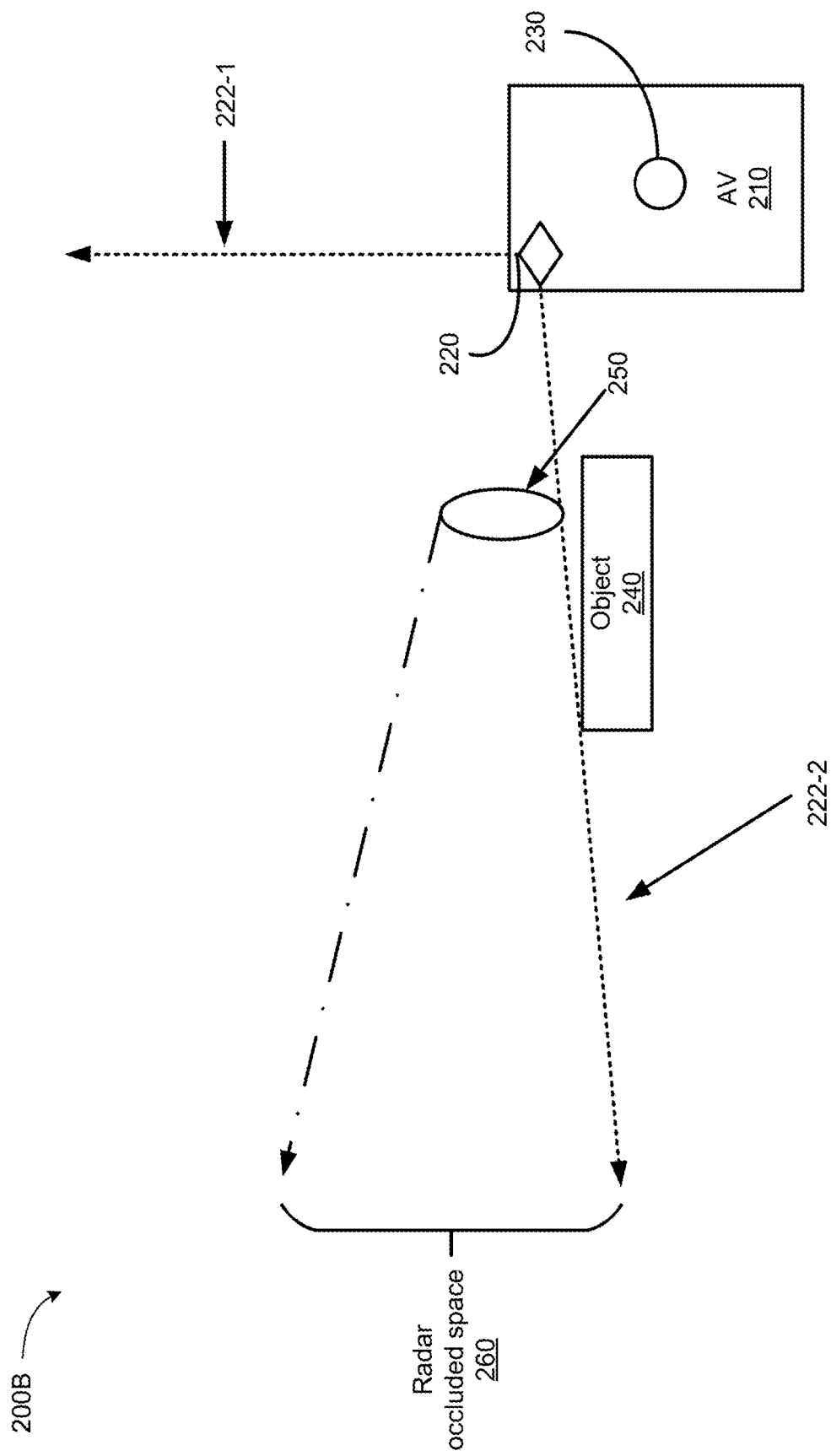
Figure 2C:
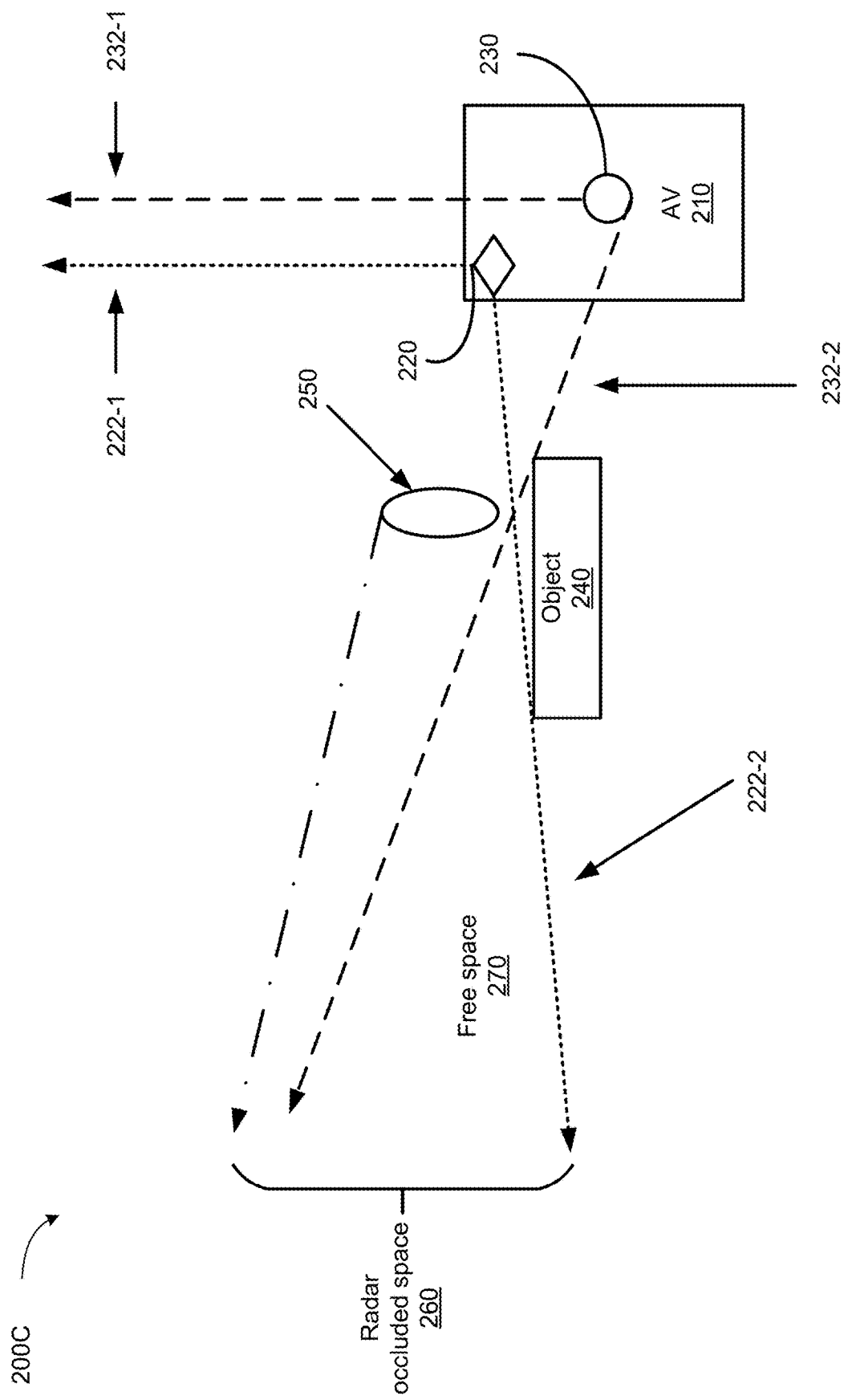

FIGS. 2A-2C are diagrams 200A-200C illustrating an example of validating occlusions observed in an autonomous vehicle (AV) driving environment, in accordance with some implementations of the present disclosure. FIG. 2A shows AV 210 including a first sensor 220 and a second sensor 230. In this illustrative example, it is assumed that the first sensor 220 is one radar sensor of the AV 210 and the second sensor 230 is one non-radar sensor of the AV 210. In some implementations, the second sensor 230 is a lidar sensor. However, such an example should not be considered limiting. For example, in some implementations, the first sensor 220 can be a non-radar sensor (e.g. lidar sensor) and the second sensor 230 can be a radar sensor.

The radar sensor 220 and the non-radar sensor 230 can be mounted on any suitable part (roof, bumper, mirrors, etc.) of an AV. For example, in this example, the radar sensor 220 can be located about a front corner of AV 210, and the non-radar sensor 230 can be located on top of AV 210. Radar sensor data can be obtained by the radar sensor 220. For example, the radar sensor 220 can scan the driving environment and detect returns (reflections) of transmitted radio waves from objects in the driving environment. Non-radar sensor data can be obtained by the non-radar sensor 230. For example, if the non-radar sensor 230 is a lidar sensor, then the non-radar sensor 230 can scan the driving environment and detect returns (reflections) of transmitted light waves from objects in the driving environment. A field-of-view of radar sensor 220 is shown in FIG. 2A. More specifically, the FOV of the radar sensor 220 is defined by boundaries 222-1 and 222-2. Further details regarding the radar sensor data are described above with reference to FIG. 1.

FIG. 2B shows object 240 within the driving environment, and occlusion 250 identified from the radar sensor data. For example, object 240 can be another vehicle, a building, etc. The existence of occlusion 250 defines radar occluded space 260 within the FOV of the radar sensor 220.

FIG. 2C shows a FOV of the non-radar sensor 230. More specifically, the FOV of the non-radar sensor 230 is defined by boundaries 232-1 and 232-2, where object 240 blocks a portion of the maximum FOV of the non-radar sensor 230. It is assumed in this example that the non-radar sensor data indicates that occlusion 250 is a false occlusion. Since occlusion 250 is a false occlusion, occlusion 250 can be removed from the FOV of first sensor 220 to reclaim free space 270. Free space 270 is a portion of the FOV of non-radar sensor 230 that was not visible to the non-radar sensor 230 due to the existence of the object 240 in the FOV of the non-radar sensor 230. For example, free space 270 is a region that neither the radar sensor 220 nor the non-radar sensor 230 could have claimed as free space before removing the false occlusion 250.

FIG. 3 illustrates an example method 300 of validating occlusions observed in autonomous vehicle (AV) driving environments, in accordance with some implementations of the present disclosure. A processing device, having one or more processing units (CPUs), and or graphics processing units (GPU) and memory devices communicatively coupled to the CPU(s) and/or GPUs, can perform method 300 and/or each of its individual functions, routines, subroutines, or operations. The processing device executing method 300 can perform instructions issued by various components of the data processing system 120 of FIG. 1 (e.g., OIVM 132). Method 300 can be directed to systems and components of an autonomous driving vehicle, such as the autonomous vehicle 100 of FIG. 1. Method 300 can be used to improve performance of the data processing system 120 and/or the AVCS 140 of FIG. 1. In certain implementations, a single processing thread can perform method 300. Alternatively, two or more processing threads can perform method 300, each thread executing one or more individual functions, routines, subroutines, or operations of the methods. In an illustrative example, the processing threads implementing method 300 can be synchronized (e.g., using semaphores, critical sections, and/or other thread synchronization mechanisms). Alternatively, the processing threads implementing method 300 can be executed asynchronously with respect to each other. Various operations of method 300 can be performed in a different order compared with the order shown in FIG. 3. Some operations of method 300 can be performed concurrently with other operations. Some operations can be optional.

At operation 310, processing logic can obtain first sensor data. For example, the first sensor data can be obtained from a first sensor of an autonomous vehicle (AV). The first sensor data can be obtained within a field-of-view (FOV) of the first sensor, and the FOV of the first sensor can have a first visibility range. The first sensor data can be a 2D perspective range image including a number of pixels (e.g., MOG pixels). Without loss of generality, columns of the 2D perspective range image can represent azimuth bins and rows of the 2D perspective range image can represent elevation angle bins. In some implementations, the first sensor data is radar sensor data obtained from a radar sensor of the AV. The radar sensor data can characterize an intensity of radar reflections from a driving environment of the AV. Each pixel can have an associated intensity value (e.g., in dBsm). In some implementations, the intensity value is an RCS value. In some implementations, the intensity value is a SNR value. In some implementations, the first sensor data is non-radar sensor data obtained from a non-radar sensor of the AV (e.g., lidar data obtained from a lidar sensor). Further details regarding obtaining the first sensor data are described above with reference to FIGS. 1-2C.

At operation 320, processing logic can identify, from the first sensor data, at least one potential occlusion. Each potential occlusion can correspond to a potential occlusion (e.g., potential object) within the driving environment. For example, each potential occlusion can be represented by a respective pixel of the radar sensor data. Identifying the potential occlusion can include determining whether the at least one potential occlusion exists within the first sensor data. In some implementations, determining whether the at least one potential occlusion exists within the first sensor data can include, for each pixel of the first sensor data, determining whether the intensity value of the pixel satisfies an intensity threshold condition. For example, processing logic can determine whether the intensity value of the pixel (e.g., RCS value or SNR value) is greater than an intensity threshold value (e.g., if the RCS value is less than or equal to about −15 dBsm). If processing logic determines that the intensity value of a pixel does not satisfy the intensity threshold condition, then processing logic can ignore the pixel. If processing logic determines that the intensity value satisfies the threshold condition, then processing logic has identified the pixel as corresponding to a potential occlusion. If no potential occlusions are identified from the first sensor data, then the process ends since there is no need to validate any potential occlusions. Further details regarding identifying potential occlusions from the first sensor data are described above with reference to FIGS. 1-2C.

At operation 330, processing logic can obtain second sensor data. For example, the second sensor data can be obtained from a second sensor of the AV different from the first sensor. The second sensor data can be obtained within a FOV of the second sensor. In some implementations, the second sensor data is non-radar sensor data obtained from a non-radar sensor. For example, the second sensor data can be lidar data obtained from a lidar sensor.

The FOV of the second sensor can have a second visibility range different from the first visibility range. In some implementations, the second visibility range is less than the first visibility range (e.g., if the first sensor is a radar sensor and the second sensor is a lidar sensor). The second sensor data can be stored as a multi-dimensional perspective range image. For example, the second sensor data can be stored as a 2D perspective range image. Without loss of generality, columns of the 2D perspective range image can represent azimuthal bins and rows of the 2D perspective range image can represent elevation angle bins.

In some implementations, obtaining the second sensor data can include compressing the multi-dimensional perspective range image into a lower-dimensional perspective range image (i.e., reducing the dimensionality of the second sensor data). For example, processing logic can compress a 2D perspective range image having a height H and a width W (H×W range image) into a 1D range image having a height of 1 and a width W (1×W range image) using a filter in the azimuth dimension ("column-wise" filter). More specifically, the filter is a column-wise filter applied to each column of the 2D range image. To be conservative, the column-wise filter can be a minimum filter. Points irrelevant to driving concerns can be ignored when reducing the dimensionality of the second sensor data. The compression can be performed to reduce computational complexity with respect to the subsequent operations of the method 300.

In some implementations, at least a portion of the 1D range image can be dilated to enhance occlusion detection. To dilate the 1D range image, processing logic can apply a dilation operator over the 1D range image. The width of the dilation operator ("kernel width") can be defined based on the radar range image azimuthal bin width. For example, the kernel width K can be 2n+1, where n is the radar range azimuthal bin width (rounded up to the nearest integer). Thus, the kernel width can be less than the total width W. Further details regarding obtaining the second sensor data are described above with reference to FIGS. 1-2C, and further details regarding compressing the multi-dimensional perspective range image are described below with reference to FIG. 5.

At operation 340, processing logic can determine, based on the non-radar sensor data, whether a potential occlusion is a false occlusion. For example, processing logic can determine whether the potential occlusion is not visible within the second sensor data.

If a potential occlusion (e.g., pixel) is not identified as a false occlusion at operation 340, this means that the potential occlusion corresponds to an actual object that is occluding the FOV of the radar sensor within the driving environment. Thus, processing logic at operation 350 can identify the potential occlusion as a valid occlusion. Otherwise, if the potential occlusion is determined to be a false occlusion, then processing logic has identified the potential occlusion as a false occlusion. In some implementations, the false occlusion is a side lobe (e.g., if the first sensor data is radar sensor data). In some implementations, the false occlusion is an overhead object. At operation 360, processing logic can remove the false occlusion. For example, processing logic can cause the false occlusion to be removed from the FOV of the first sensor. By removing the false occlusion from the FOV of the first sensor, free space within the FOV of the first sensor can be reclaimed. Reclaiming the free space within the FOV of the first sensor can enable the first sensor to continue searching for occlusions further downrange beyond the false occlusion, which can improve the ability of the AV to navigate within the driving environment. In some implementations, the free space corresponds to a region of the driving environment within the FOV of the first sensor and outside of the FOV of the second sensor (e.g., the free space 270 of FIG. 2C).

At operation 370, processing logic can cause a driving path of the AV to be determined. The driving path of the AV can be determined based on the free space that was reclaimed at operation 360, or based on the valid occlusion identified at operation 350. For example, processing logic can communicate AV sensor data to an AV control system (e.g., the AVCS 140 of FIG. 1). Illustratively, if the potential occlusion is identified as a valid occlusion at operation 350, then the AV sensor data can include sensor data with the valid occlusion. Alternatively, if the potential occlusion is identified as a false occlusion and removed at operation 360, then the AV sensor data can include sensor data based on the free space (i.e., without the false occlusion), which can improve the FOV of the first sensor. The AV control system can chart a new driving path (or modify the existing driving path) in view of the AV sensor data. The AV control system can implement the new driving path by outputting instructions to powertrain and steering, vehicle electronics, signaling, etc., to cause the AV to brake, change lanes, stop, back up, accelerate, and so on, and to ensure that the AV follows the determined driving path. Further details regarding operations 310-370 are described above with reference to FIGS. 1-2C.

Figure 4:
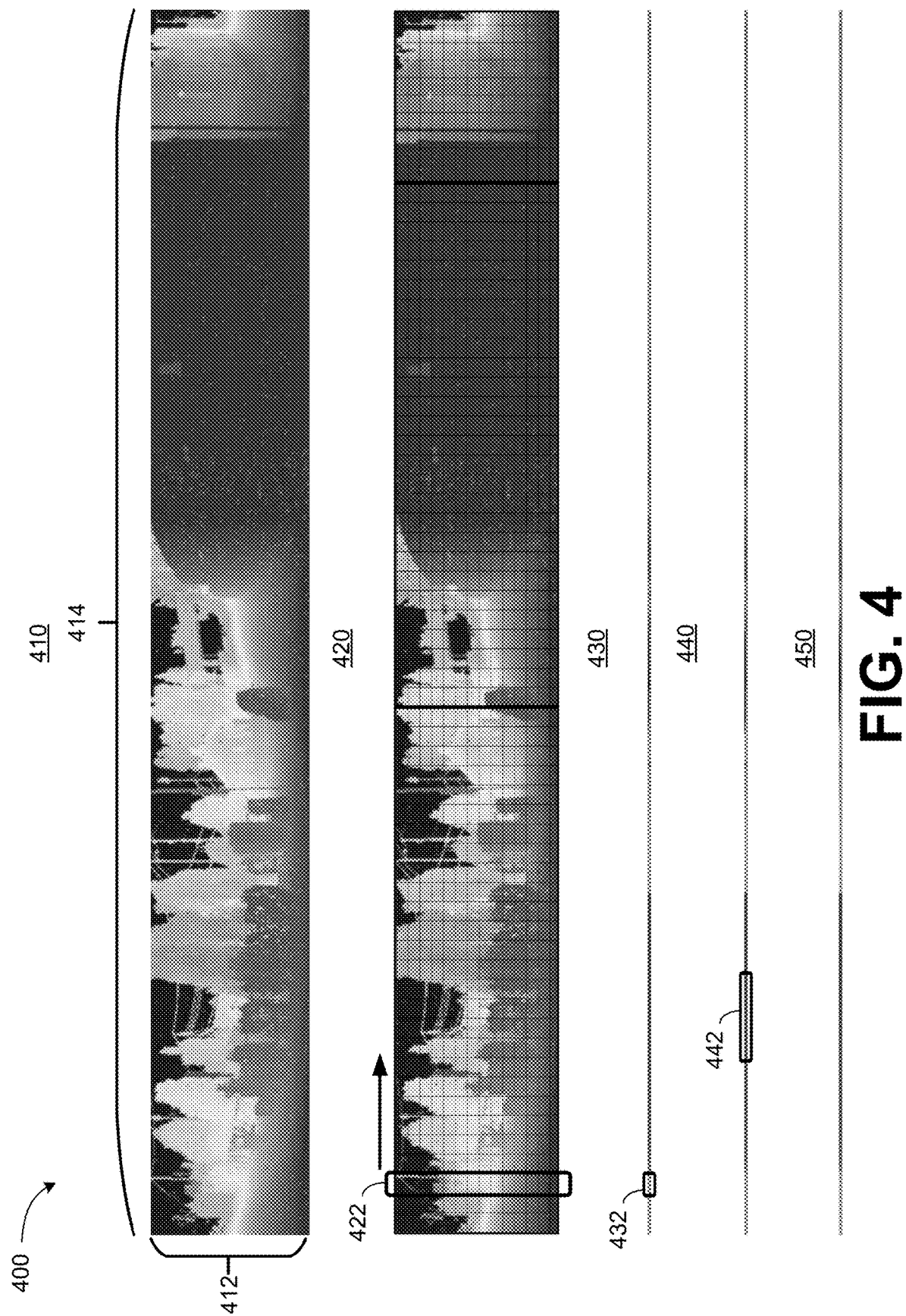
FIG. 4 are diagrams illustrating range image compression, in accordance with some implementations of the present disclosure.

FIG. 4 are diagrams 400 illustrating range image compression, in accordance with some implementations of the present disclosure. For example, diagram 410 of a range image is shown. The range image 410 includes a plurality of pixels generated from non-radar sensor data obtained by a non-radar sensor of an AV. For example, the non-radar sensor can be a lidar sensor. In this example, the range image 410 is a 2D range image having a height (H) 412 defined by a plurality of rows and a width (W) 414 defined by a plurality of columns. Accordingly, the range image is an H×W image.

As shown in diagram 420, a filter 422 is applied to the range image. The filter 422 can be a column-wise filter that is applied to each column of the range image shown in diagram 410 to select a 1D output. The filter 422 can be referred to as an H×1 filter. Each column can represent the distance to the nearest occlusion in the direction defined by the respective column.

As shown in diagram 430, a compressed range image is generated using the output of the filter (e.g., output 432). More specifically, in this example, the compressed range image includes a plurality of 1D outputs. Each 1D output corresponds to a respective column of the range image. Thus, the compressed range image is a 1×W range image including a single row and the plurality of columns.

In some implementations, one or more dilation steps can be performed to dilate the compressed range image. For example, as shown in diagram 440, a dilation kernel 442 can be applied over at least a portion of the compressed range image to obtain a dilated range image 450. The dilation kernel 442 can be a 1×K dilation kernel applied over K columns of the compressed range image.

Figure 5:
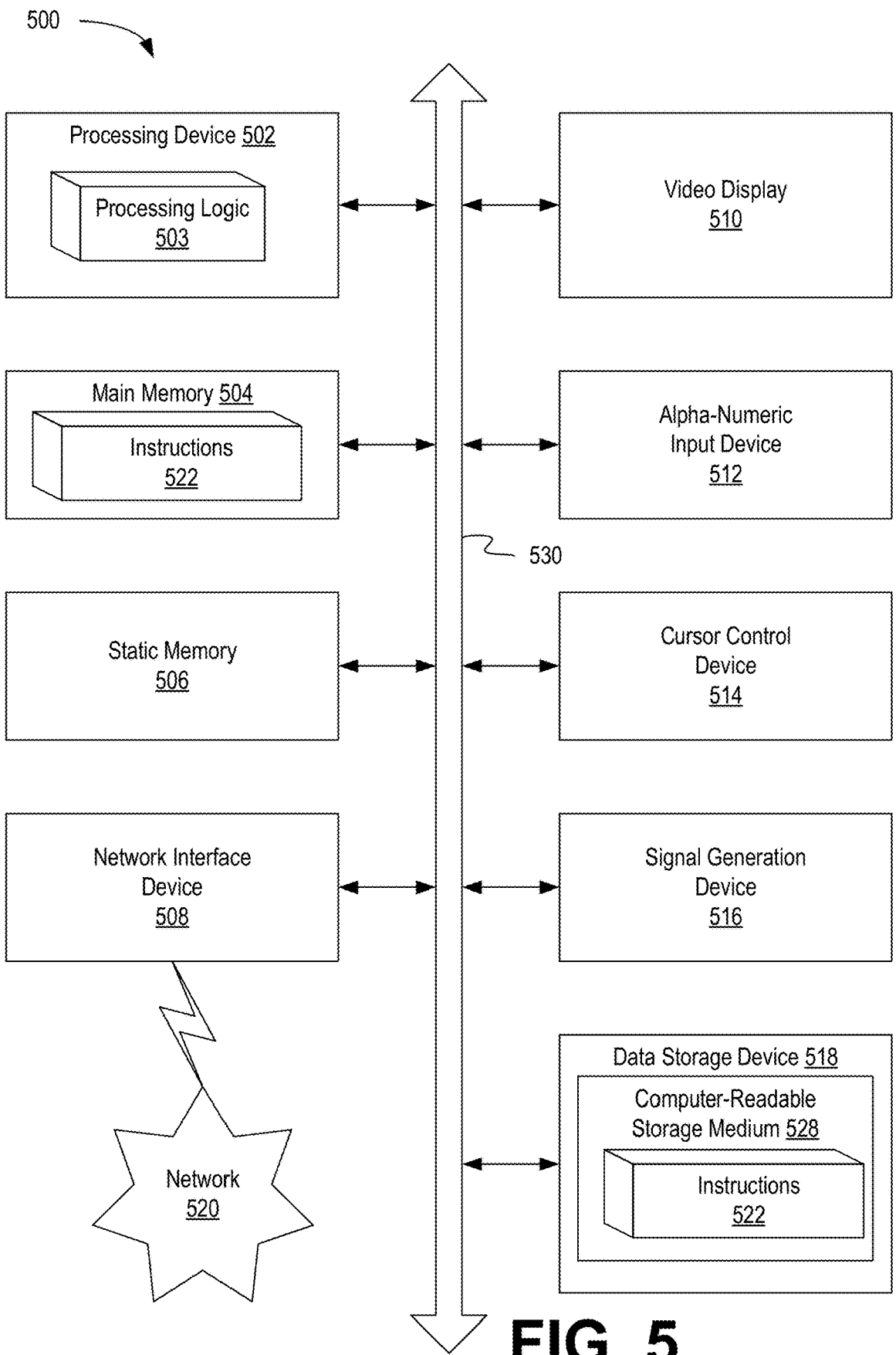
FIG. 5 is a block diagram of an example computer device, in accordance with some implementations of the present disclosure.

FIG. 5 depicts a block diagram of an example computer device 500 capable of enabling fast and reliable object identification and tracking in autonomous driving environments, in accordance with some implementations of the present disclosure, in accordance with some implementations of the present disclosure. Example computer device 500 can be connected to other computer devices in a LAN, an intranet, an extranet, and/or the Internet. Computer device 500 can operate in the capacity of a server in a client-server network environment. Computer device 500 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 500 can include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which can communicate with each other via a bus 530.

Processing device 502 (which can include processing logic 503) represents one or more general-purpose processing devices such as a microprocessor, central processing unit, or the like. More particularly, processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 can be configured to execute instructions performing method of validating occlusions observed in autonomous vehicle (AV) driving environments (e.g., method 300 of FIG. 3).

Example computer device 500 can further comprise a network interface device 508, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 can include a computer-readable storage medium (or, more specifically, a non-transitory computer-readable storage medium) 528 on which is stored one or more sets of executable instructions 522. In accordance with one or more aspects of the present disclosure, executable instructions 522 can comprise executable instructions for performing a method of validating occlusions observed in AV driving environments (e.g., method 300 of FIG. 3).

Executable instructions 522 can also reside, completely or at least partially, within main memory 504 and/or within processing device 502 during execution thereof by example computer device 500, main memory 504 and processing device 502 also constituting computer-readable storage media. Executable instructions 522 can further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "obtaining," "identifying," "determining," "removing," "causing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
a memory storing instructions; and
a processing device operatively coupled to the memory, wherein the instructions, when executed by the processing device, cause the processing device to perform operations comprising:
obtaining first sensor data from a driving environment of an autonomous vehicle (AV), the first sensor data corresponding to a field-of-view (FOV) of a radar sensor of the AV;
identifying, from the first sensor data, a potential occlusion within the driving environment;
obtaining second sensor data from the driving environment, the second sensor data corresponding to a FOV of a second sensor of the AV different from the first sensor;
reducing dimensionality of the second sensor data, wherein reducing the dimensionality of the second sensor data comprises ignoring portions of the second sensor data that satisfy one or more driving irrelevance criteria;
determining, from the second sensor data having reduced dimensionality, whether the potential occlusion is a false occlusion; and
in response to determining that the potential occlusion is a false occlusion, removing the false occlusion from the FOV of the first sensor.

2. The system of claim 1, wherein removing the false occlusion from the FOV of the first sensor comprises reclaiming free space within the FOV of the first sensor, and wherein the operations further comprise causing a driving path of the AV to be determined based on the free space.

3. The system of claim 2, wherein the free space corresponds to a region of the driving environment within the FOV of the first sensor and outside of the FOV of the second sensor.

4. The system of claim 1, wherein the operations further comprise:
in response to determining that the potential occlusion is not a false occlusion, identifying the potential occlusion as a valid occlusion; and
causing a driving path of the AV to be determined with the valid occlusion.

5. The system of claim 1, wherein the first sensor data comprises radar sensor data and the second sensor data comprises non-radar sensor data.

6. The system of claim 1, wherein the potential occlusion corresponds to a pixel of the first sensor data, and wherein identifying the potential occlusion comprises determining that an intensity value of the pixel satisfies an intensity threshold condition.

7. The system of claim 1, wherein the second sensor data is stored as a multi-dimensional perspective range image, and wherein obtaining reducing the dimensionality of the second sensor data further comprises compressing the multi-dimensional perspective range image into a lower-dimensional range image to reduce computational complexity.

8. A method comprising:
   obtaining, by a processing device, first sensor data from a driving environment of an autonomous vehicle (AV), the first sensor data corresponding to a field-of-view (FOV) of a radar sensor of the AV;
   identifying, by the processing device from the first sensor data, a potential occlusion within the driving environment;
   obtaining, by the processing device, second sensor data from the driving environment, the second sensor data corresponding to a FOV of a second sensor of the AV different from the first sensor;
   reducing dimensionality of the second sensor data, wherein reducing the dimensionality of the second sensor data comprises ignoring portions of the second sensor data that satisfy one or more driving irrelevance criteria;
   determining, from the second sensor data having reduced dimensionality, whether the potential occlusion is a false occlusion; and
   in response to determining that the potential occlusion is a false occlusion, removing, by the processing device, the false occlusion from the FOV of the first sensor.

9. The method of claim 8, wherein removing the false occlusion from the FOV of the first sensor comprises reclaiming free space within the FOV of the first sensor, and wherein the method further comprises causing, by the processing device, a driving path of the AV to be determined based on the free space.

10. The method of claim 9, wherein the free space corresponds to a region of the driving environment within the FOV of the first sensor and outside of the FOV of the second sensor.

11. The method of claim 8, further comprising:
   in response to determining that the potential occlusion is not a false occlusion, identifying, by the processing device, the potential occlusion as a valid occlusion; and
   causing, by the processing device, a driving path of the AV to be determined with the valid occlusion.

12. The method of claim 8, wherein the first sensor data comprises radar sensor data and the second sensor data comprises non-radar sensor data.

13. The method of claim 8, wherein the potential occlusion corresponds to a pixel of the first sensor data, and wherein identifying the potential occlusion comprises determining that an intensity value of the pixel satisfies an intensity threshold condition.

14. The method of claim 8, wherein the second sensor data is stored as a multi-dimensional perspective range image, and wherein reducing the dimensionality of the second sensor data further comprises compressing the multi-dimensional perspective range image into a lower-dimensional range image to reduce computational complexity.

15. A non-transitory computer-readable storage medium having instructions stored thereon that, when executed by a processing device, cause the processing device to perform operations comprising:
   obtaining radar sensor data from a driving environment of an autonomous vehicle (AV), the radar sensor data corresponding to a field-of-view (FOV) of a radar sensor of the AV;
   determining, from the radar sensor data, whether a potential occlusion exists within the driving environment;
   in response to determining that a potential occlusion exists within the driving environment, obtaining non-radar sensor data from the driving environment, the non-radar sensor data corresponding to a FOV of a non-radar sensor of the AV;
   reducing dimensionality of the second sensor data, wherein reducing the dimensionality of the second sensor data comprises ignoring portions of the second sensor data that satisfy one or more driving irrelevance criteria;
   determining, from the second sensor data having reduced dimensionality, whether the potential occlusion is a false occlusion;
   in response to determining that the potential occlusion is a false occlusion, removing the false occlusion from the FOV of the radar sensor to reclaim free space within the FOV of the radar sensor; and
   causing a driving path of the AV to be determined based on the free space.

16. The non-transitory computer-readable storage medium of claim 15, wherein the operations further comprise:
   in response to determining that the potential occlusion is not a false occlusion, identifying the potential occlusion as a valid occlusion; and
   causing a driving path of the AV to be determined with the valid occlusion.

17. The non-transitory computer-readable storage medium of claim 15, wherein the non-radar sensor data comprises lidar sensor data.

18. The non-transitory computer-readable storage medium of claim 15, wherein the potential occlusion corresponds to a pixel of the radar sensor data, and wherein identifying the potential occlusion comprises determining that an intensity value of the pixel satisfies an intensity threshold condition.

19. The non-transitory computer-readable storage medium of claim 15, wherein the free space corresponds to a region of the driving environment within the FOV of the radar sensor and outside of the FOV of the non-radar sensor.

20. The non-transitory computer-readable storage medium of claim 15, wherein the non-radar sensor data is stored as a multi-dimensional perspective range image, and wherein reducing the dimensionality of the second sensor data further comprises compressing the multi-dimensional perspective range image into a lower-dimensional range image to reduce computational complexity.

* * * * *